United States Patent [19]

Chu et al.

[11] Patent Number: 4,886,600

[45] Date of Patent: Dec. 12, 1989

[54] MOISTURE AND GLYCERINE RESISTANT POLYURETHANE COMPOSITIONS FOR SEPARATORY DEVICES

[75] Inventors: Yuan C. Chu, East Windsor; Melvin Brauer, E. Brunswick, both of N.J.

[73] Assignee: CasChem, Inc., Bayonne, N.J.

[21] Appl. No.: 161,568

[22] Filed: Feb. 18, 1988

[51] Int. Cl.$^4$ .............................................. B01D 13/01
[52] U.S. Cl. ........................... 210/321.8; 210/321.89; 210/500.23
[58] Field of Search ...................... 210/321.71, 321.78, 210/321.79, 321.8, 321.81, 321.87, 321.88, 321.89, 321.9, 500.23, 500.27, 500.33, 500.37, 500.38, 500.39

[56]  References Cited

U.S. PATENT DOCUMENTS

Re. 31,389  9/1983  Brauer et al. .................... 210/321.3
3,228,876  1/1966  Mahon ................................... 210/22
3,339,341  9/1967  Maxwell et al. ........................ 55/16
3,962,094  6/1976  Davis et al. ...................... 210/321 R
4,170,559  10/1979  Kroplinski et al. ............. 210/321 A
4,256,617  3/1981  Kroplinski et al. ............. 260/18 TN
4,267,044  5/1981  Kroplinski et al. ............. 210/321.2
4,284,506  8/1981  Tetenbaum ...................... 210/321.4
4,332,927  6/1982  Simone ................................ 528/58
4,533,598  8/1985  Downey et al. .................... 428/380

*Primary Examiner*—Frank Sever
*Attorney, Agent, or Firm*—Pennie & Edmonds

[57]  ABSTRACT

Polyurethane compositions comprising isocyanate cured specific equivalent weight hydroxyl bearing components used as potting compounds or sealants for hollow fiber or folded membrane biomedical separatory devices, especially when such devices contain containments such as glycerine or water.

30 Claims, No Drawings

MOISTURE AND GLYCERINE RESISTANT POLYURETHANE COMPOSITIONS FOR SEPARATORY DEVICES

TECHNICAL FIELD

The invention relates to polyurethanes which are useful as potting and sealing compounds for biomedical devices, particularly for applications where moisture, water or glycerine will be encountered during the assembly of such devices.

BACKGROUND ART

In the past, polyurethane compositions based on an isocyanate-terminated prepolymer comprising the reaction product of a polyol and a polyisocyanate cured with one or more polyfunctional crosslinking agents have been described in the art. Of particular concern herein are polyurethanes based on prepolymers comprising the reaction product of long chain fatty acid esters such as castor oil with organic polyisocyanates.

For example, in U.S. Pat. No. 3,362,921 to Ehrlich et al, curing agents for prepolymers based on the reaction product of active hydrogen-containing compounds such as castor oil, polyester amides and polyalkylene ether glycols with organic diisocyanates are described. These agents are esters of polyhydric alcohols containing at least four hydroxy groups and an aliphatic acid having at least 12 carbon atoms and one or more hydroxy and/or epoxy groups. The cured polyurethanes find use as flocking adhesives, paper coatings, potting compositions and encapsulating compounds for electronic parts.

U.S. Pat. No. 3,483,150 to Ehrlich et al. discloses prepolymer compositions which are the reaction product of at least one polyfunctional compound containing active hydrogens with an arylene diisocyanate and a low viscosity or solid polyfunctional isocyanate derived from the reaction of aniline and formaldehyde and having a functionality of 2 or greater, preferably between 2 and 3. The prepolymers are cured to elastomers by adding to the prepolymer at least one curing agent comprising a material containing two or more active hydrogen groups. Such curing agents include the curing agent of U.S. Pat. No. 3,362,921 and in addition, a glycol, glycerol, polyglycol, or polyalkylene glycol mono- or di-ester of a hydroxy carboxylic acid having at least 12 carbon atoms. Certain amines are useful in curing the prepolymers and include primary and secondary aliphatic, cyclic, aromatic, aralkyl and alkaryl diamines.

In U.S. Pat. No. 3,962,094 to Davis, a hollow fiber separatory device useful for dialysis, ultra-filtration, reverse osmosis, hemodialysis, etc., is provided. This device consists of a plurality of fine, hollow fibers whose end portions are potted in a tube sheet and whose open fiber ends terminate in a tube sheet face which provides liquid access to the interior of the fibers. The tube sheet comprises a cured polyurethane consisting essentially of a prepolymer based on the reaction product of castor oil with at least one mole per castor oil hydroxy group of an organic diisocyanate and crosslinked with either castor oil or an ester of a polyhydric alcohol having a hydroxyl functionality of 4 or more and an organic acid containing at least 12 carbon atoms and one or more hydroxy and/or epoxy groups per molecule, or mixtures of castor oil and the such esters.

Patents representative of the art of hollow fiber separatory devices include U.S. Pat. Nos. 2,972,349; 3,228,876; 3,228,877; 3,339,341; 3,442,088; 3,423,491; 3,503,515; and 3,551,331: the disclosures of which are incorporated herein by reference.

The sealing collar is typically derived from a resin which is capable of encapsulating the fibers to provide a seal which prevents the fluid inside the hollow fibers from mixing with the fluid outside the fibers.

A preferred class of resins useful for preparing the sealing collars are flexible polyurethane forming systems as illustrated by U.S. Pat. Nos. 3,362,921; 3,708,071; 3,722,695; 3,962,094; 4,031,012; 4,256,617; 4,284,506; 4,332,927 and Re. 31,389. Centrifugal casting, as illustrated by U.S. Pat. No. 3,492,698, is a representative method employed for preparing sealing collars. In accordance with such a technique, a holding device containing a bundle of fibers arranged in a parallel configuration is placed into a centrifugal-like device which incorporates a potting material reservoir with tubes connecting it to end-molds. An appropriate resin is placed into the potting reservoir and maintained at an appropriate temperature. The entire assembly is then rotated to force the resin down the connecting tubes by the centrifugal force. The resin thereby flows around and among the fibers in the end-molds. The rotation is continued until the resin gels. When polyurethanes are employed as the resin, typical residence time in the centrifuge can vary from about 1 to about 2 hours at room temperature. When rotation is completed the resin impregnated fiber bundle is removed and post-cured. The end molds are then removed and the fiber ends are opened by cutting through the resin collar perpendicular to the fiber bundle.

Other sealing collar forming techniques rely on the force of gravity to force the resin into a mold containing the ends of the hollow fibers. The resin is allowed to gel and then is post-cured.

Regardless of the particular method employed for preparing the sealing collar, the polyurethanes typically employed therein exhibit extended gel and demold times.

In addition to hollow fiber separatory devices, folded membrane separatory devices have also been used in chemical separations such as dialysis, osmotic processes and hemodialysis. In a folded membrane artificial kidney, for example, a membrane sheet is multiply-folded or pleated to form a series of adjacent channels, each channel located between opposed faces of each fold. The edges of the folds in the membrane are sealed together by potting the edges in a sealant. The membrane is then placed in a case usually comprised of polystrene, a styrene-acrylonitrile copolymer or a polycarbonate polymer wherein the chemical separation takes place. In the case of dialysis, the dialysis solution is placed on one side of the membrane and blood is placed on the other side. Polyepoxides and polyurethanes have generally been used to seal the edges of the folded membranes. U.S. Pat. No. 4,267,044 provides a thixotropic polyurethane composition which is particularly useful for sealing such folded membrane devices.

The polyurethane systems of the prior art which have been used to pot the ends of hollow fiber or folded membrane separatory devices have various limitations. For example, the fibers have to be dried prior to potting, otherwise, residual moisture will cause bubbling in the composition when contacting the polyurethane mixtures prior to cure. The drying process is costly and in some cases is not possible, for example, with fibers requiring a large amount of glycerine to sustain pore openings. In addition to the significant amount of moisture or water which exists in these devices, glycerine, which interferes with the reaction between isocyanates and polyols, is also present. The polyurethane systems of the prior art are not suitable for fibers containing great amount of moisture or glycerine. The present invention provides compositions which overcome these problems by utilizing specific hydroxyl bearing compounds and isocyanate compounds which accelerate the reaction of the composition, thus preventing bubble formation.

SUMMARY OF THE INVENTION

The invention relates to biomedical devices of hollow fiber or membrane construction, the ends of which are potted with a polyurethane composition of the reaction product of a liquid ester of a carboxylic acid having at least 8 carbon atoms and an equivalent weight of 275 or less, preferably less than 200, with a polyisocyanate compound. In an alternate embodiment, the polyurethane composition includes the reaction product of a polyether compound having at least 2 hydroxyl groups and an equivalent weight of 185 or less with a polyisocyanate compound. Mixtures of these hydroxyl bearing components may be used to form additional compositions, provided that the equivalent weights of each component in the polyol mixture is as stated above. Also, prepolymers of these polyols can be used if desired.

The invention also relates to methods for sealing the ends of hollow fiber or folded membrane separatory devices with the previously described compositions.

DETAILED DESCRIPTION OF THE PREFERRED EMBODIMENTS

The polyols which may be used according to this invention include esters of carboxylic acids having at least 8 carbon atoms, such esters being liquid at ambient temperature and having a hydroxyl functionality of at least 2. To obtain desirable esters, the carboxylic acid generally contains less than about 25 carbon atoms and preferably between 12 and 20. Hydroxyl functionality as used herein is the average number of hydroxyl groups per molecule of ester compound. As noted above, a specific equivalent weight of the overall polyol component is necessary to achieve the desired results of the invention.

These hydroxyl bearing components include esters of ricinoleic acid with polyhydric alcohols, which form a polyricinoleate compound or a combination of polyricinoleate compounds having a hydroxy functionality of 2 or more and an equivalent weight of between about 60 and 275. Such compounds include various di, tri, and tetraricinoleate compounds alone, mixed together, or combined with other polyols provided that the equivalent weight of the mixture or combination is maintained within the range stated above.

These esters are preferably ricinoleic acid polyol esters and more preferably castor oil. Castor oil is a naturally occurring triglyceride of ricinoleic acid. Castor oil is actually a mixture of mono-, di-, and triglyercides and has an average hydroxyl functionality of 2.7. Other ricinoleic acid polyol esters include glycol, polyglycol and other polyhydric alcohol mono-, di-, and polyesters of ricinoleic acid. These ricinoleic acid polyol esters can be made by methods well known in the art, e.g., by direct esterification of ricinoleic acid with alcohols such as ethylene glycol, glycerine, propylene glycol, hexylene glycol, diethylene glycol, dipropylene glycol, hexamethylene glycol, polyethylene and polypropylene glycols, sucrose or sorbitol.

Specific ricinoleate ester compounds include ethylene glycol mono-, di- ricinoleates, propyl mono- and di- ricinoleates, penta erythritol mono-, di-, tri-, tetra- and penta- ricinoleates, glycerol ricinoleate, 1,4-cyclohexane dimethanol mono- and di- ricinoleates, butane diol diricinoleate, neopentyl glycol mono- and di- ricinoleates, and mono- or di- ricinoleates of N,N-bis (2-hydroxy propyl) aniline or N,N,N,$^1$N$^1$ - tetrakis (2-hydroxy propyl) ethylene diamine.

A second group of hydroxyl bearing components which are suitable in the compositions of this invention include one or more polyether polyols having a functionality of at least 2 and an equivalent weight between about 30 and 185.

The preferred polyether polyols are polyether triols, and more particularly polyoxypropylene triols. Generally, these polyether triols are prepared by condensing a large excess of an alkylene oxide, such as ethylene oxide or propylene oxide with a glycol, as is well known in the art. The glycol can be a diol such as alkylene glycols, e.g., ethylene glycol or propylene glycol, a triol such as glycerine, a tetrol such as pentaerythritol, etc. Particularly preferred polyols for this invention comprise polyoxypropylene triols, having an equivalent weight of between about 30 and 185.

The organic polyisocyanates which are suitable for this invention include any diisocyanate or polyisocyanate compound. These compounds are well known in the prior art.

Diisocyanates which may be used in this invention include: the arylene diisocyanates, represented by the diisocyanates of the benzene and napthalene series, or mixtures of these compounds. Illustrative of such arylene diisocyanates include: toluene diisocyanate (2,4/2,6); toluene 2,4- diisocyanate; toluene 2, 6- diisocyanate; m-phenylene diisocyanate, xenylene 4,4- diisocyanate; napthalene 1,5 diisocyanate; 3,3-bitolylene 4,4-diisocyanate; diphenylene methane 4,4'-diisocyanate (MDI); 4-chlorophenylene 2,4-diisocyanate; dianisidine diisocyanate, diphenylene ether 4,4'-diisocyanate, and polymeric isocyanates such as polymethylene polyphenylene isocyanate. Other arylene diisocyanates which are useful include lower alkyl and alkoxy-substituted derivatives. Aliphatic and cycloaliphatic diisocyanates, such as isophrone diisocyanate (IPDI), can be employed. Mixtures of arylene and aliphatic or cycloaliphatic diisocyanates can be used in the compositions of this invention. Isocyanate adducts such as modified MDI, trimers, TMP-TDI adducts and biurets of hexamethylene diisocyanate can also be used, if desired.

The amount of organic polyisocyanate to be reacted with the polyol should be sufficient to provide between one and 1.4 mole, preferably between about 1 and 1.1 mole, of diisocyanate per hydroxy group of polyol. For prepolymer formation, an NCO/OH ratio of above about 2:1 and preferably about 3:1 and up to about 7:1 or more is desirable. The most preferred range is between about 4:1 and 5:1 to insure the formation of an isocyanate-terminated prepolymer which is capable of further reaction with the hydroxyl bearing component.

Generally, the polyurethanes based on the above-described polyricinoleate compounds or mixtures provide a minimum hardness of about 50 shore D after reaction with the organic isocyanate compound. Similarly, the polyurethanes based on the previously described polyether polyols provide a hardness of at least 80 shore D after reaction with the isocyanate compound.

EXAMPLES

The scope of the invention is further described in connection with the following examples which are set forth for the sole purpose of illustrating the preferred embodiments of the invention and which are not to be construed as limiting the scope of the invention in any manner. In these examples, all parts given are be weight unless otherwise specified.

EXAMPLE 1

A prepolymer was prepared as follows:
411 of castor oil was added to 189 of toluene diisocyanate (TDI) gradually at a temperature of 35° C. After addition, the temperature was raised up to 60°-70° C. to complete the reaction.

The resulted prepolymer was diluted with 40% of Desmodur W, a hydrogenated MDI. The final product had viscosity of about 3000 cps at 25° C., an NCO % of 16.8, and free TDI content of 0.8%.

100 g of this prepolymer was mixed with 175 g of an ester of pentaerythritol of ricinoleic acid and 0.2% of a dioctyl tin ricinoleate catalyst. The mixture was quickly degassed and then used as a potting compound.

A hollow fiber biomedical separatory device having hollow fibers containing large amounts of glycerin was potted with this polyurethane composition. Potting is accomplished by a centrifugal casting technique as described in U.S. Pat. Nos. 3,228,876 and 3,962,094. The potted area was cut into slices at right angles to reveal the open ends of the fiber tubes. These slices were then immersed into water for 1 minute. The appearance of the slice was then examined by microscope for contact of the potting compound to the hollow fibers and for retention of the fiber geometry. No whitening of the composition due to the absorption of water was found. Furthermore, the polyurethane of this example provided excellent fiber contact and geometry retention without significant volume or strength changes.

EXAMPLES 2-7

Various polyol blends of the ricinoleates listed in the table below were prepared as in Example 1, except that the isocyanate compound utilized was tetra methyl xylene diisocyanate (TMXDI) and that prepolymers were not formed. These compositions were used to pot the separatory device as described in Example 1. The water immersion test results are listed in the following chart:

| Example | Weight Percentage | | | | | |
|---|---|---|---|---|---|---|
| | 2 | 3 | 4 | 5 | 6 | 7 |
| PEMDR[1] | 72 | 63 | 58 | 80 | 73 | 82 |
| castor oil | 28 | 37 | 42 | | | |
| BDDR[2] | | | | 20 | 27 | |
| 1,4 CHDMDR[3] | | | | | | 18 |
| Equivalent Weight | 198 | 209 | 216 | 181 | 198 | 189 |
| Hardness, Shore D | 60 | 50 | 45 | 55 | 50 | 65 |
| Water Immersion Test Result | P | B | F | P | B | P |

Notes
[1]penta erythritol monoricinoleate
[2]butane diol diricinoleate
[3]1,4-cyclohexane dimethanol diricinoleate
B = borderline
F = failed
P = pass For each formulation 0.1% of dioctyl tin diricinoleate catalyst was utilized.

Thus, to pass the water immersion test, it is seen that the ricinoleate blends should preferably have an equivalent weight of less than about 200 and a hardness of higher than about 50 Shore D depending upon the ricinoleate used. This hardness range is established based on the use of a single diisocyanate, TMXDI. Other isocyanates may provide better performance so that higher equivalent weight ricinoleate blends (i.e., up to 275) can be used, as shown below.

EXAMPLES 8-14

Various polyol blends of ricinoleates were mixed with the isocyanate, Desmodur W, and used to pot the separatory devices as described in Example 1. The water immersion test results were listed in the following table:

| Example | Weight Percentage | | | | | | |
|---|---|---|---|---|---|---|---|
| | 8 | 9 | 10 | 11 | 12 | 13 | 14 |
| PEMDR | 36 | 26 | 52 | 41 | 32 | 39 | 32 |
| castor oil | 64 | 74 | | | | | |
| BDDR | | | 48 | 59 | 68 | | |
| 1,4 CHDMDR | | | | | | 61 | 68 |
| Equivalent Weight | 251 | 271 | 228 | 247 | 266 | 255 | 271 |
| Hardness, Shore D | 60 | 55 | 60 | 50 | 28 | 55 | 35 |
| Water Immersion Test Result | P | B | P | B | F | P | B |

For each example, the appropriate amount of catalyst was utilized. To pass the water immersion test, it is seen that the ricinoleate polyol blends should show an equivalent weight of less than about 275. Also, the hardness of these compositions should be above 50 Shore D and preferably about 55 to 60, depending upon the specific ricinoleate and polyisocyanate compounds used.

EXAMPLES 15-18

A diphenyl methane diisocyanate based prepolymer, (Vorite 689 from CasChem, Inc.) was mixed with various polyol blends including certain polypropylene glycols (PPG) or ricinoleate compounds, and then used to pot the separatory devices as described in Example 1. The results of water immersion testing for these compounds are listed below:

| Example | Weight Percentage | | | |
|---|---|---|---|---|
| | 15 | 16 | 17 | 18 |
| Lupranol 3300[5] | — | — | 73 | 65 |
| Lupranol 2030[6] | — | — | 27 | 35 |
| PEMDR | 25 | 17.6 | — | — |
| castor oil | 75 | 82.4 | — | — |
| catalyst | None | None | DTD[4] | DTD[4] |
| equivalent weight | 273 | 296 | 182 | 200 |

-continued

| Example | Weight Percentage | | | |
|---|---|---|---|---|
| | 15 | 16 | 17 | 18 |
| hardness (Shore D) | 65 | 60 | 80 | 75 |
| Water Immersion Test | P | B | P | F |

Notes
[4] dioctyl tin diricinoleate
[5] polyoxypropylene triol eq. wt. 140
[6] polyoxypropylene triol eq. wt. 1000

As shown in the examples, not all compositions passed the water immersion test, and certain ranges of equivalent weight of polyol blends and the hardness of polyurethane system are required for each combination. With ricinoleates, the equivalent weight should be less than about 275 and preferably less than 200, with a hardness higher than about 50 Shore D to provide a polyurethane system which will pass the water immersion test. With polypropylene glycols, the required equivalent weight should be less than about 185 and hardness should be higher than about 80 Shore D.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A hollow fiber separatory device capable of use in biomedical applications comprising a hollow fiber bundle consisting of a plurality of fine hollow fibers whose end portions are potted in a tube-sheet and whose open fiber ends terminate in a tube-sheet face, the resulting bundle being sealed within a casing to a form a separatory cell having two or more fluid ports which allow for the passage of one fluid through the fibers and another around the fibers without mixing of the two fluids, said tube-sheet comprising a cured polyurethane composition comprising the reaction product of a polyol of a liquid ester of a carboxylic acid having at least 8 carbon atoms, said polyol having an equivalent weight of between 60 and 275; and an organic polyisocyanate compound; the reactants of said reaction comprising preselected properties for accelerating said reaction sufficient to substantially preclude bubble formation.

2. The device of claim 1 wherein the polyol has an equivalent weight of less than 200.

3. The device of claim 1 wherein the resulting hardness of the polyurethane is 50 Shore D or greater.

4. The device of claim 1 wherein the organic polyisocyanate compound and polyol are present in substantially stoichiometric amounts.

5. The device of claim 1 wherein a portion of the polyisocyanate compound and the polyol are initially reacted to form a prepolymer before reaction with the remaining portion of polyol.

6. The device of claim 1 wherein the polyol is an ester of ricinoleic acid and a polyhydric alcohol.

7. A hollow fiber separatory device capable of use in biomedical applications comprising a hollow fiber bundle consisting of a plurality of fine hollow fibers whose end portions are potted in a tube-sheet and whose open fiber ends terminate in a tube-sheet face, the resulting bundle being sealed within a casing to a form a separatory cell having two or more fluid ports which allow for the passage of one fluid through the fibers and another around the fibers without mixing of the two fluids, said tube-sheet comprising a cured polyurethane composition comprising the reaction product of a polyether polyol having at least 2 hydroxyl groups and an equivalent weight of between 30 and 185; and an organic polyisocyanate compound; the reactants of said reaction comprising preselected properties for accelerating said reaction sufficient to substantially preclude bubble formation.

8. The device of claim 7 wherein the hardness of the polyurethane is 80 Shore D or greater.

9. The device of claim 7 wherein the organic polyisocyanate compound and polyricinoleate compound are present in substantially stoichiometric amounts.

10. The device of claim 7 wherein a portion of the polyether polyol and the polyisocyanate compound are initially reacted to form a prepolymer before reaction with the remaining portion of the polyether polyol.

11. A biomedical separatory device comprising semipermeable membrane separating means whose extremities are potted in holding means, the resulting separating means being sealed by the holding means to a casing to form a separatory cell having two or more fluid ports which allow passage of one fluid on one side of the separating means and another fluid on the other side of said separating means without mixing of the two fluids, said holding means comprising a cured polyurethane composition comprising the reaction product of a polyol of a liquid ester of a carboxylic acid having at least 8 carbon atoms, said polyol having an equivalent weight of between 60 and 275; and an organic polyisocyanate compound; the reactants of said reaction comprising preselected properties for accelerating said reaction sufficient to substantially preclude bubble formation.

12. The device of claim 11 wherein the polyol has an equivalent weight of less than 200.

13. The device of claim 11 wherein the resulting hardness of the polyurethane is 50 Shore D or greater.

14. The device of claim 11 wherein the organic polyisocyanate compound and polyol are present in substantially stoichiometric amounts.

15. The device of claim 11 wherein a portion of the polyol and the polyisocyanate compound are initially reacted to form a prepolymer before reaction with the remaining portion of the polyol.

16. The device of claim 11 wherein the polyol is an ester of ricinoleic acid and a polyhydric alcohol.

17. A biomedical separatory device comprising semipermeable membrane separating means whose extremities are potted in holding means, the resulting separating means being sealed by the holding means to a casing to form a separatory cell having two or more fluid ports which allow passage of one fluid on one side of the separating means and another fluid on the other side of said separating means without mixing of the two fluids, said holding means comprising a polyurethane composition comprising the reaction product of a polyether polyol having at least 2 hydroxyl groups and an equivalent weight of between 30 and 185; and an organic polyisocyanate compound; the reactants of said reaction comprising preselected properties for accelerating said reaction sufficient to substantially preclude bubble formation.

18. The device of claim 17 wherein the resulting hardness of the polyurethane is 80 Shore D or greater.

19. The device of claim 17 wherein the organic polyisocyanate compound and polyricinoleate compound being present in substantially stoichiometric amounts.

20. The device of claim 17 wherein a portion of the polyricinoleate compound and the polyisocyanate compound are initially reacted to form a prepolymer before reaction with the remaining portion of polyricinoleate compound.

21. A hollow fiber separatory device capable of use in biomedical applications comprising a hollow fiber bundle consisting of a plurality of fine hollow fibers whose end portions are potted in a tube-sheet and whose open fiber ends terminate in a tube-sheet face, the resulting bundle being sealed within a casing to a form a separatory cell having two or more fluid ports which allow for the passage of one fluid through the fibers and another around the fibers without mixing of the two fluids, said tube-sheet comprising a cured polyurethane composition comprising the reaction product of a hydroxyl bearing component comprising from 1 to 99 weight percent of a liquid ester of a carboxylic acid having at least 8 carbon atoms, said ester having an equivalent weight of between 60 and 275, and from 99 to 1 weight percent of an polyether polyol having an equivalent weight of between 30 and 185; and an organic isocyanate compound; the reactants of said reaction comprising preselected properties for accelerating said reaction sufficient to substantially preclude bubble formation.

22. The device of claim 21 wherein the organic polyisocyanate compound and hydroxyl bearing component are present in substantially stoichiometric amounts.

23. The device of claim 21 wherein a portion of the hydroxyl bearing component and the polyisocyanate compound are initially reacted to form a prepolymer before reaction with the remaining portion of hydroxyl bearing component.

24. The device of claim 21 wherein either of said ester or said polyether polyol is initially reacted with a portion of the polyisocyanate compound to form a prepolymer.

25. The device of claim 21 wherein said ester is a ricinoleate compound having an equivalent weight of 200 or less.

26. A biomedical separatory device comprising semipermeable membrane separating means whose extremities are potted in holding means, the resulting separating means being sealed by the holding means to a casing to form a separatory cell having two or more fluid ports which allow passage of one fluid on one side of the separating means and another fluid on the other side of said separating means without mixing of the two fluids, said holding means comprising a polyurethane composition comprising the reaction product of a hydroxyl bearing component comprising from 1 to 99 weight percent of a liquid ester of a carboxylic acid having at least 8 carbon atoms, said ester having an equivalent weight of between 60 and 275, and from 99 to 1 weight percent of an polyether polyol having an equivalent weight of between 30 and 185; and an organic isocyanate compound; the reactants of said reaction comprising preselected properties for accelerating said reaction sufficient to substantially preclude bubble formation.

27. The device of claim 26 wherein the organic polyisocyanate compound and hydroxyl bearing component are present in substantially stoichiometric amounts.

28. The device of claim 26 wherein a portion of the hydroxyl bearing component and the polyisocyanate compound are initially reacted to form a prepolymer before reaction with the remaining portion of hydroxyl bearing component.

29. The device of claim 26 wherein either said ester or said polyether polyol is initially reacted with a portion of the polyisocyanate compound to form a prepolymer.

30. The device of claim 26 wherein said ester is a ricinoleate compound having an equivalent weight of 200 or less.

* * * * *